(12) United States Patent
Lahmann et al.

(10) Patent No.: US 10,430,458 B2
(45) Date of Patent: Oct. 1, 2019

(54) AUTOMATED DATA EXTRACTION FROM A CHART FROM USER SCREEN SELECTIONS

(71) Applicant: think-cell Software GmbH, Berlin (DE)

(72) Inventors: Dominik Lahmann, Berlin (DE); Philipp Nordhus, Berlin (DE); Arno Schodl, Berlin (DE)

(73) Assignee: THINK-CELL SOFTWARE GMBH, Berlin (DE)

( * ) Notice: Subject to any disclaimer, the term of this patent is extended or adjusted under 35 U.S.C. 154(b) by 28 days.

(21) Appl. No.: 15/393,441

(22) Filed: Dec. 29, 2016

(65) Prior Publication Data

US 2018/0189248 A1    Jul. 5, 2018

(51) Int. Cl.
*G06F 16/583* (2019.01)
(52) U.S. Cl.
CPC ...... *G06F 16/5846* (2019.01); *G06F 16/5838* (2019.01); *G06F 16/5854* (2019.01)
(58) Field of Classification Search
CPC .............. G06F 17/24; G06F 17/30253; G06F 16/5846; G06F 16/5838; G06F 16/5854
See application file for complete search history.

(56) References Cited

PUBLICATIONS

Capture2text, http://capture2text.sourceforge.net/ as published on Nov. 19, 2016, Retrieved from https://web.archive.org/web/20161119005359/http://capture2text.sourceforge.net/ on Mar. 23, 2018.*
ScientificNotation, published Nov. 20, 2010. retrieved from https://web.archive.org/web/20101120055015/https://www.bigideasmath.com/protected/content/ipe_va/grade%207/09/g7_09_04.pdf on Mar. 28, 2018.*

* cited by examiner

*Primary Examiner* — Cesar B Paula
*Assistant Examiner* — Konrad J Kulikowski
(74) *Attorney, Agent, or Firm* — Harness, Dickey & Pierce, P.L.C.

(57) ABSTRACT

A method for automatically extracting data from a chart includes generating and displaying a graphical user interface (GUI) enabling a user to select a screen area covering one or more screens at least partially, the screen area displaying a chart; in response to determining that the user has selected the screen area, automatically taking a screenshot of the selected screen area and automatically performing an image analysis of the screenshot for extracting data from the chart contained in the screenshot; in response to determining that the image analysis of the screenshot has completed successfully, automatically displaying or enabling a selectable GUI element; and in response to a select action of the user having selected said selectable GUI element, outputting the extracted data.

15 Claims, 4 Drawing Sheets

AUTOMATED DATA EXTRACTION FROM A CHART FROM USER SCREEN SELECTIONS

FIELD OF THE INVENTION

The invention relates to the field of data processing, and more particularly to the automated extraction of data from digital chart images.

BACKGROUND AND RELATED ART

To simplify the understanding, data is typically represented graphically in all kinds of electronic as well as paper-based media. For example, charts are commonly used for presenting data on web pages, online- and print magazines. Charts depicted in print media can be digitized by capturing the chart with a camera or a scanning device for providing a digital representation of the chart. A large variety of different chart types exists, e.g. bar charts, pie charts, doughnut charts or the like. Charts of a particular type, e.g. a pie chart, may vary greatly e.g. in respect to the colors or textures used, regarding the size, type, position and orientation of labels and/or titles and regarding the interpretation of numerical separator symbols.

In case the data that is graphically represented in a digital chart image shall be used as a basis for further processing, the complexity and diversity of digital charts has hitherto often resulted in poor data quality, the extraction of erroneous data or has precluded an automated extraction of data completely. Thus, in many cases a user had to type in the data represented by a chart in a target application by hand.

Moreover, even in case the data extraction from a digital chart image was performed automatically, it often required massive user intervention and many man-machine interactions for extracting data and transferring data to a target application. For example, chart elements that were overseen by the algorithm or wrong assignments of data to series or categories had to be corrected manually.

Many of the existing programs work only on a few specific chart types or require a user to upload chart images which may comprise confidential data to remote image analysis servers.

SUMMARY

Embodiments of the invention provide an improved method, computer program product and system for extracting data from a chart. Corresponding methods, computer program products and computer systems are specified in the independent and dependent claims. Embodiments of the present invention can freely be combined with each other if they are not mutually exclusive.

In one aspect, the invention relates to a method for automatically extracting data from a chart, the method comprising:
  generating and displaying, by a capture module, a graphical user interface (GUI) enabling the user to select a screen area covering one or more screens at least partially, the screen area displaying a chart;
  in response to determining, by the capture module, that the user has selected the screen area, automatically taking a screenshot of the screen area and automatically performing, by the capture module, an image analysis of the screenshot for extracting data from the chart contained in the screenshot;
  in response to determining that the image analysis successfully extracted the data, displaying or enabling a selectable GUI element by the capture module;
  selectively in response to a select action of the user having selected said selectable GUI element, outputting, by the capture module, the extracted data.

According to embodiments, the graphical user interface enables the user to select the screen area that displays the chart irrespective of the type of the application program that generated and rendered the chart and irrespective whether said application program is remote or local to the capture module.

According to some embodiments, the graphical user interface that enables the user to select the screen area comprises a frame. The interior of the frame is transparent or semi-transparent for enabling the user to view the area of one or more screens currently covered by said frame. The frame is movable by the user over the screen and thus can be moved over the chart that is displayed on the one or more screens. The capture module is configured to determine that the user has selected the screen area upon determining that the user has dropped the frame and is neither resizing nor moving the frame over the one or more screens. The screenshot comprises the screen area that is covered by the frame.

In a further aspect, the invention relates to a computer readable medium comprising instructions that when executed by a processor causes the processor to execute a method according to any one of the embodiments described herein.

In a further aspect, the invention relates to a computer system comprising one or more processors, a screen capture module and one or more screens. The screen capture module is adapted for automatically extracting data from a chart. The data extraction comprises:
  generating and displaying a graphical user interface enabling the user to select a screen area covering one or more screens at least partially, the screen area displaying a chart;
  in response to determining that the user has selected the screen area, automatically taking a screenshot of the screen area and automatically performing, by the capture module, an image analysis of the screenshot for extracting data from the chart contained in the screenshot;
  in response to determining that the image analysis successfully extracted the data, displaying or enabling a selectable GUI element by the capture module;
  selectively in response to a select action of the user having selected said selectable GUI element, outputting, by the capture module, the extracted data.

In a further aspect, the invention relates to the extraction of numerical data from an array of symbols. The array can be derived, for example, from a digital image, in particular a chart, e.g. by means of an optical character recognition (OCR) technique. The array of symbols can be, for example, the label string of a bar of a bar chart. The extraction of the numerical data comprises:
  identifying a string in an image by applying an OCR algorithm, the string being an array of symbols;
  analyzing each of the symbols for assigning values to a set of variables sign, n, k and $c_{sep}$, wherein n is a number variable representing a concatenation of all symbols of the string identified as being digits, sign is a signs symbol contained in the string, if any, $c_{sep}$ is the last identified decimal separator symbol in the string, if any, and k is the position of the last identified decimal separator symbol in the string, if any; and computing a numerical value nv according to nv=sign n*10$^{k-roundup(log_{10}n)}$; and returning the numerical value nv.

BRIEF DESCRIPTION OF THE DRAWINGS

In the following embodiments of the invention are explained in greater detail, by way of example only, making reference to the drawings in which.

DETAILED DESCRIPTION

Embodiments of the invention may have multiple benefits.

Providing a user interface that automatically starts analyzing and extracting data from a screenshot comprising a chart may be advantageous as the number of man-machine interactions is significantly reduced.

It has been observed that in particular on data processing devices with small displays, the selection of screen areas may not always capture a chart of interest completely or may capture dark background sections that may erroneously be considered as a bar by an image segmentation algorithm. The selection of screen areas may be erroneous particularly often on small screens as the selection may be performed with fingers or a comparatively large stylus and the finger or stylus may hide parts of the screen elements during the act of selection. As a consequence, the selected region may not cover a chart completely and chart data may be lost. Alternatively, the selected screen area may include graphical elements which are not part of the chart. In case those "extra-chart" objects have some similarity with chart elements, e.g. bars, this may result in an erroneous identification of chart-external elements as chart components and in an erroneous data extraction. Thus, the number of man-machine interactions (which are considered as particularly inconvenient and error prone on devices with small displays) may be minimized as the act of selecting a different screen area automatically terminates any ongoing image analysis of a previously selected screen area and triggers the screen capturing and analysis of the newly selected screen area.

The GUI according to embodiments of the invention may enable a user to correct a wrong selection immediately without any additional steps for explicitly causing an ongoing analysis to terminate.

Using a frame that automatically captures a screenshot upon being dropped by a user on a graphical user interface presented on one or more screens and that automatically starts to perform an image analysis enables a user to extract data represented in a chart by a minimum of manual steps, Basically, the dropping of the frame on a suited position on a virtual desktop or the releasing of the frame by quitting any movement or resizing actions are sufficient for initiating the capturing of the screenshot and for starting the image analysis. No extra button or menu selection is necessary. The fact that a frame is kept on the same position and keeps its size is interpreted as a signal that indicates that the user considers the area covered by the frame as relevant, e.g. as completely covering a chart whose data shall be extracted. Then, after the image analysis has completed (and optionally, after some overlay GUI elements are displayed which indicate that the image analysis was able to correctly identify the relevant components of the chart), the user merely has to select the selectable GUI element, e.g. a selectable button or a selectable menu element, for triggering the capture module to output the data extracted by the image analysis step.

According to embodiments, the capture module is instantiated on a handheld, battery powered mobile telecommunication device, e.g. a smartphone or tablet computer. Using the frame for capturing a chart image may be particularly advantageous on those types of data processing system because typically the screens of said systems are small and any user-machine interaction is particularly error prone. Thus, ideally, the only two steps for data extraction from a chart that need to be performed by a user are the dropping of the frame at the appropriate position and the selection of the selectable GUI after its appearance or enablement to initiate the data export to a target application or to the clipboard. Thus, erroneous or time consuming data entry steps which commonly occur when manually or semi-automatically extracting data from charts with small display devices can be avoided.

In a further beneficial aspect, the frame comprises a transparent or semi-transparent inner portion allowing a user to view the area covered by the frame except a small region covered by the outer pixel belt of the frame. The outer pixel belt of the frame can be, for example, opaque or semi-transparent. For example, the frame may have a solid border of about 10 pixels while its interior is completely transparent. The frame may have an initial size of e.g. 300 px×300 px and may be resizable by a user by a user's selection and repositioning of handles, e.g. selectable outer borders and/or corners of the frame.

In a further beneficial aspect, the fact that the chart is captured as a screenshot enables a user to take charts contained in basically any possible source as input: the chart may be presented on a web page, as part of a locally stored image file, as part of a pdf or Microsoft Word file, or any other possible source that is displayed on a screen of the user. The screen capture module may be installed locally, e.g. as a stand-alone application program or as an add-in of another program such as Microsoft Excel or Microsoft PowerPoint. Thus, the user does not have to upload any image (which may comprise confidential data) to a server for performing the data extraction and is not bound to a particular input format.

The extracted data can be exported to a spreadsheet application, a charting application, an application for generating a presentation or any other kind of office application program. For example, the data can be exported as a .csv file to Microsoft Excel, PowerPoint or OpenOffice. According to one example, the extracted data is automatically copied to the clipboard for manually pasting the numbers in the form of a table in a document of an arbitrary application program, in particular a spreadsheet application program like Excel. The program receiving the extracted data may be caused by the capture module to automatically create a new chart from the extracted data. According to some examples, the user or the capture module may configure or dynamically control the program receiving the extracted data such that the new chart is generated in accordance with a predefined and/or user selected layout. For example, the colors of the chart may be the colors in accordance with a corporate design of a company. Thus, charts published in many different layouts and color schemes in many different media may be used for efficiently creating charts in a desired layout and color scheme.

According to embodiments, the capture module implements an interface to one or more target applications such as Microsoft Excel, PowerPoint, Open Office or the like. The capture module may be configured such that it identifies an instantiated target program and automatically forwards the output generated by the image analysis via an appropriate interface of the target application program to the target application program. For example, the capture module may be an Excel Add-In and may be initialized in the program context of Excel. Thus, the instantiated Excel Add-In implicitly "knows" and is configured to forward the output of the image analysis to its program context (in this case Excel) as the target application. Thus, the configuration of the capture module may comprise an address or an interface of the first or the second application that allows the capture module to send the extracted data to the first or second application program. This may be beneficial as the only user action required to transfer the extracted tabular data to the target application may be a selection of an "export" button of the GUI. Thus, the number of man-machine interactions is further reduced.

According to embodiments, the target application program to which the capture module exports the image analysis results is specified in a configuration of the capture module. The exporting of the extracted data to the target application program is performed automatically in accordance with the configuration and is performed without prompting the user to specify a target application program to receive the exported data. The target application program can be, for example, a program configured for automatically generating charts from tabular data structures. The capture module causes the target program to automatically generate a new chart from the extracted data. In addition, or alternatively, the target application program is a program configured for automatically analyzing numerical data contained in tabular data structures extracted by the image analysis of the capture module. The target program outputs a numerical result generated by the analysis of the extracted data. For example, the target program may be a statistics program performing statistical analyses.

According to embodiments, the frame remains in the foreground of all windows presented on the one or more screens irrespective of whether the user selects one of the one or more windows as active (and editable) window at least while the screenshot capturing and the image analysis is performed. The frame and the windows presented on the one or more screens become active or inactive in dependence on the user's selection after the completion of the image analysis. For example, a browser depicting a chart generated by a web site may be the first window displayed on the one or more screens. Excel or another spreadsheet application may be the second window displayed on the one or more screens. A mail client program and a business application may be the third and the fourth window displayed on the one or more screens. At least while the user moves the frame over the screens and, after having released the frame, while the image analysis is currently executed, the frame is displayed on top of all displayed windows irrespective of whether the user selects one of them to become the active window. This allows the user to arrange the displayed windows and bring the window depicting a chart to the foreground without losing track of the frame capturing the chart. In addition, it may prevent the user from unintentionally interrupting the analysis process by re-selecting the frame as the active window: any re-selection action may slightly move the frame and thus abort the image analysis.

Depending on the embodiment, the frame may be automatically instantiated and displayed by the capture module upon instantiating the capture module and the user may solely have to move and/or resize the frame such that it covers the area of interest. The frame may be moved and/or resized by a mouse, by the finger(s) of a user, by a stylus or any other suitable input device.

According to embodiments, the capture module displays one or more overlay GUI elements in response to determining that the image analysis successfully extracted the data. The overlay GUI elements are indicative of identified chart elements of the chart and are displayed on top of the chart. For example, in case a frame is used for capturing the pixel matrix covered by the frame, the overlay GUI elements are presented within the interior of the frame and on top of the chart. For example, the overlay GUI elements can be lines demarking axes of a plot or borders of a chart segment, e.g. a pie chart segment, a bar segment, or the like. The overlay GUI elements may be semi-transparent or transparent pixel regions of a particular color which indicate to which data series a particular chart element, e.g. a bar or bar segment, was automatically assigned to during the image analysis. This may be advantageous as the overlay GUI elements provide some visual feedback information on the accuracy of the image analysis. The user will be able to recognize if some bars of the chart were missed, if an axis was not identified correctly and/or if bars or bar segments were erroneously assigned to data series. In case the overlay GUI elements indicate that an error occurred, the user may simply reposition or resize the frame for initializing the capturing of a new screenshot and a new image analysis. If the overlay GUIs indicate that the image analysis was able to correctly identify the relevant elements of the chart, the user may simply select the selectable GUI element, e.g. a button that was displayed or enabled upon the image analysis terminated, for triggering the outputting of the extracted data, e.g. to a target program or to the clipboard.

According to embodiments, the extracted data comprises one or more items of a group comprising:
  numerical data being indicative of the quantity of one or more elements of a data series; for example, the numerical data could be the numerical values displayed above or over a bar or bar segment which represent the amount of an item represented by said bar or bar segment;
  axis labels being indicative of intervals of axes of the chart;
  label strings of one or more axes of the chart;
  label strings of one or more data series of the chart;
  label strings of one or more categories of the chart. A category may be, for example, a particular year or other time interval, the sex, the age, or any other kind of attribute of an object or person.

According to embodiments, said labels and strings are analyzed by an OCR method for identifying individual symbols within the strings and are analyzed for extracting the numerical value encoded in the string according to embodiments of the invention described herein.

According to embodiments, the capture module automatically aborts, in response to determining that the size or position of the selected screen area was changed by the user, the image analysis. For example, this may happen upon determining that the frame was resized or moved by the user. In response to determining that the user has selected a further screen area and does neither resize nor reposition the selection of the further screen area (e.g. upon determining that the user has dropped the frame and is neither resizing nor moving the frame), the capture module automatically takes a further screenshot of the selected further screen area (e.g. the screen area covered by the frame) and automatically performs the image analysis of the further screenshot.

According to embodiments, the selection of a screen area comprises "dropping" (or "releasing") a frame. The dropping of a frame as used herein may comprise keeping the left mouse button pressed while moving the frame over the screen, releasing the pressed left mouse button for dropping ("releasing") the frame onto a desired area of the one or more screens. No further, explicit user action is necessary for triggering the capturing of the screenshot and the image analysis of said screenshot.

According to embodiments, the extracted data is a tabular data structure that represents each category of the analyzed chart as a column and each series of the analyzed chart as a row or vice versa. The tabular data may comprise a numerical data value in each table cell. The outputting of the extracted data comprises exporting the extracted data into a first application program configured for automatically generating charts from tabular data structures; and generating, by the first application program, a new chart from the extracted data.

In addition, or alternatively, the outputting of the extracted data comprises exporting the extracted data into a second application program configured for automatically analyzing numerical data contained in tabular data structures; and outputting, by the second application program, a numerical result generated by the analysis of the extracted data.

For example, the first application program may be Microsoft PowerPoint or Microsoft Excel which enables a user to select a table and generates a new chart within PowerPoint from the data in a selected table with a very limited set of user interactions. The second application can also be Excel or a statistical or mathematical application whose built-in or predefined mathematical functions (SUM, AVERAGE, user-defined) may be applied to the data.

According to embodiments, taking the screenshot comprises reading pixel intensity values from a screen buffer. The pixel intensity values are read selectively for each of the one or more screens which are at least partially covered by the selected screen area (e.g. for screens that are at least partially covered by a frame). For example, in case the capture module runs on a system comprising a first, a second, a third and a fourth LCD screen and the frame used for selecting a screen area covers a portion of the first screen and a portion of the second screen but does not cover any pixel of the third and fourth screen, the capture module reads pixel information from the screen buffers of the first and second screens but not from the third and fourth screen. For technical reasons, the reading of a screen buffer is typically performed such that all pixels of a screen buffer are read out. Typically, a screen buffer of a screen comprises pixel information of pixels currently displayed on said screen ("intra-viewport pixels"). Additionally, the virtual screen may comprise pixels which are not displayed on any physical screen and thus are not part of the viewport ("extra-viewport pixels") and may not provide pixel intensity information. By selectively reading pixel data from screen buffers of those screens being at least partially covered by the selected screen area, the amount of data that is read is reduced and the performance is increased: pixel information of the screen buffers of the third and fourth screens are neither read nor processed.

According to some embodiments, the capture module, after having read pixel intensity information (e.g. rgb color information) selectively from those screens being at least partially covered by the selected screen area, computes a pixel mask of same size and shape as the selected screen area. The pixel mask is a data structure that comprises metadata information indicating, for each pixel in the mask, whether it is an intra-viewport pixel or an extra-viewport pixel, i.e. if it is located on one of the one or more screens covered by the selected screen area at the moment the frame is dropped on the one or more screens and the screenshot is taken. For example, the selected screen area (which may have been selected by a user using a frame) may have a rectangular shape and the computation of the pixel mask, i.e., the pixel regions which are covered by the selected screen area, comprises the identification of all pixels (intra-viewport pixels and extra-viewport pixels) which are covered by the selected screen area, identifying the intra- or extra-viewport status of each identified pixel and storing this status information as meta data in the pixel mask.

When the capture module performs an image analysis on the screenshot, e.g. for identifying segments and segment borders, the capture module ignores all pixels of the selected screen area that are identified as extra-viewport pixels by said pixel mask.

Thus, the capturing of the screenshot may comprise the following steps:

a) A user selects a screen area of a virtual screen, e.g. by a frame as described above. The selected screen area may be entirely placed on a single physical screen or may cover multiple physical screens and optionally also extra-viewport regions of the virtual screen.

b) The capture module identifies the screen buffers of the screens being at least partially covered by the selected screen area.

c) The capture module reads intensity information (e.g. color values) from the identified screen buffers for the pixels covered by the selected screen area. The read intensity information is stored as the screenshot that was captured by the frame. In case the selected screen area covers extra-viewport pixels, some of the pixels in the screenshot may have assigned some "false" color information of extra-viewport pixels for which actually no color information is available, e.g. "black" indicating the absence of a color value for said pixel.

d) In addition, the capture module stores the coordinates of the extra-viewport pixels covered by the selected screen area, e.g. in the form of a pixel mask;

e) When the capture module performs an image analysis of the screenshot, the capture module ignores the color information of pixels which are, according to the pixel mask, extra-viewport pixels. For example, the screenshot can be generated such that selectively the intensity information of intra-viewport pixels covered by the selected screen area are stored as part of the generated screenshot while extra-viewport pixels do not have assigned any intensity value. Alternatively, the generated screenshot may comprise also the "false" color information, but the capture module is configured to ignore the extra-viewport pixels covered by the selected screen area when performing the image analysis.

This may be beneficial as the screen buffers may merely comprise pixel intensity information of the viewport pixels and may lack any information if a pixel is an extra-viewport pixel at the moment a screenshot is captured. By storing the intra- and extra-viewport status of all pixels covered by the selected screen area in a pixel mask data structure in addition to the intensity information, it may be possible to determine, when performing an image analysis, if some particular intensity value, e.g. an rgb color value "000" for black, is indicative of a black color in an intra-viewport pixel or is indicative of the non-availability of intensity information. This may reduce the number of pixels to be analyzed and may prevent errors when performing various image analysis tasks, e.g. image segmentation, OCR, or the like. Thus, the speed of image analysis as well as the image analysis quality may be increased. In particular, said features increase the robustness of the image analysis, in particular image segmentation, in a multi-screen environment: The identification and use of a pixel mask for filtering as described above may ensure that extra-viewport pixels whose pixel data represents a technical default value instead of intensity information of an element of a chart is ignored and is not erroneously considered to represent a chart object.

For example, a first screen may be used for displaying a web-browser, e.g. Mozilla Firefox, a second screen may be used for displaying a spreadsheet application, and the chart may be displayed in a third pop-up window generated by the browser. The pop-up window may span the first and the second screen and the frame may be positioned and resized by the user such that it covers the chart and thus also covers parts of the first and the second screens. A growing number of computer systems are connected to two or more comparatively large display devices, e.g. LCD/TFT monitors. Thus, a significant amount of processing capacity and time is saved by selectively reading the pixels from screen buffers of screens actually covered by the frame and a significantly more robust chart analysis may be enabled by identifying and filtering out the extra-viewport pixels covered by the frame. The filtering-out of the extra-viewport pixels covered by the frame may be performed as part of the screenshot capturing process, thereby preventing said pixels to become part of the screenshot from the beginning. Alternatively, the extra-viewport pixels covered by the selected screen area may simply be filtered out and ignored by the capture module later during image analysis and segmentation.

According to embodiments, the image analysis comprises identifying a plurality of bars depicted in the screenshot. For example, the chart can be a horizontal or vertical bar chart and comprise one or more categories and one or more bars per category. As a horizontal bar chart and a vertical bar chart differ from each other basically only in respect to their orientation (one being rotated by 90° compared to the other chart type), any example and assertion given herein for a horizontal bar chart likewise applies to a vertical bar chart rotated by 90° and vice versa.

For example, the bars of a bar chart or the segments of a pie chart may be identified by performing an edge detection and/or connected component analysis on the screenshot for identifying a plurality of typical geometric objects, e.g. rectangles as bars or segments as the components of a pie chart.

According to embodiments, the extracted data comprises numerical data. The extraction of the numerical data comprises:
  identifying a string in the chart by applying an OCR algorithm, the string being an array of symbols;
  analyzing each of the symbols for assigning values to a set of variables sign, n, k and $c_{sep}$, wherein n is a number variable representing a concatenation of all symbols of the string identified as being digits, sign is a signs symbol contained in the string, if any, $c_{sep}$ is the last identified decimal separator symbol in the string, if any, and k is the position of the last identified decimal separator symbol in the string, if any;
  computing a numerical value nv according to nv=sign n*$10^{k-roundup(log_{10} n)}$; and
  returning the numerical value nv.

According to embodiments, the extracted data comprises numerical data and the extraction of the numerical data comprises:
  defining a set of valid signs, a set of valid digits, a set of valid decimal separators and a set of valid non-terminating symbols;
  initializing a sign variable sign, a number-variable n, a string position counter i, a decimal separator candidate variable $c_{sep}$ and an observed decimal-separator position variable k;
  identifying a string in the chart, the string being an array of symbols; for each of the symbols s[i] in the array from left to right:
    a) checking if the current symbol is element of the valid signs set;
    b) if a) returns true, set the sign variable to the current symbol, select next symbol and proceed to d);
    c) if a) returns false, proceed to d);
    d) checking if the current symbol is element of the valid digits set;
    e) if d) returns true, assign a new concatenated value to the number-variable n according to n←n·s[i], select next symbol and proceed to d);
    f) if d) returns false, checking if the current symbol is element of the valid decimal separator set;
    g) if f) returns true, checking if the current symbol has already been assigned to the current decimal separator $c_{sep}$ in the string, and if so, setting k to empty; otherwise, assigning the current symbol value to $c_{sep}$ and assigning roundup($log_{10}$ n) to k; select next symbol and proceed to d);
    h) if f) returns false, checking if the current symbol is element of the valid non-terminating symbols set;
    i) if h) returns true, select next symbol and proceed to d);
    j) if h) returns false and k is not empty, output a numerical value nv computed according to nv=sign n*$10^{k-roundup(log_{10} n)}$.

Said features may be advantageous as an accurate method for accurately identifying decimal separators, decimal separator positions (via variable k) and the corresponding, convention-dependent numerical value specified in a symbol string may be provided.

The identification of decimal separators is often an error prone task as OCR algorithms often have difficulties in discriminating "." and "," symbols and as a plurality of different national and international conventions regarding the specification of numbers exist. For example, the symbol string 3,000 in EU convention represents the value "3" with three positions after the decimal separator ",". The same symbol string 3,000 in US convention represents the value "3000". By identifying symbols in a string which belong to a set of valid decimal separators (e.g. "." or ",") and by determining if more than a single decimal separators exist in the string, an accurate method for decimal separator identification is provided, leading to some decimal interpretation of some input string. The method does not recognize a "," symbol in a string "1,000,000" as a decimal separator as it occurs twice, Thus, the numerical value of the string will be correctly interpreted as "1000000".

According to embodiments, the image analysis comprises extracting multiple symbol strings from the chart. Then, a subset of symbol strings and their positions are identified which have an identical or similar orientation, symbol size, symbol layout and/or symbol font and are likely to follow a joint numerical model, e.g. linear model, representing some axis interval or bar values.

Extracting the numerical value of any of the symbol strings of the subset may result in multiple numerical interpretations. From all interpretations for each symbol string of the subset, the one that best fits a joint numerical model is chosen, e.g. the one that fits some model, e.g. a linear model, with the smallest error. Thus, in case the subset of symbol strings comprises the strings s1="349", s2="938" and s3="1,023" at regarding increasing positions, the numerical values 349, 938 and 1023 will be extracted, but s3 will not be interpreted as 1.023.

According to some embodiments, at least one numerical value per bar is extracted from the chart in the screenshot during the image analysis. In some examples, a string comprising numerical values is contained in the chart on top of or as an overlay of each of the bars. In other examples, only some of the bars comprise a numerical value on top of or as an overlay of the bar. In still other examples, at least the x or y axis corresponding to the height dimension of the bars comprises a numerical value. The numerical values extracted from the chart are determined by measuring the height of each bar (or bar segment) in the chart. For example, the height of each bar can be measured in pixels. Then, the capture module identifies a numerical reference value acting as label of a respective axis point of the chart; alternatively, said numerical reference value may be derived from another bar in the chart that has assigned a numerical string, e.g. as an overlay or as a string located above the upper border of the bar. Then, the capture module computes the numerical value as some best fitting model from the height of the bar.

Thus, even in case a chart (e.g. for space reasons) does not comprise a label being indicative of the numerical value represented by each bar, these numerical values may nevertheless be automatically and accurately extracted from the bars of the chart.

According to embodiments, n, sign, k are returned together with nv for each or some of the chart elements and a respectively assigned string. The chart elements can be, for example, horizontally or vertically oriented bars and the chart can be a horizontal or vertical bar chart. For example, the capture module may comprise an OCR algorithm that automatically identifies labels that overlay or are in spatial proximity of a bar and extracts a respective symbol string from each numeric label. The capture module extracts, for each bar having assigned such a label and a corresponding symbol string, the nv, n, sign and k computed for said symbol string. In addition, the capture module automatically identifies the height of the respective bars. The capture module checks if nv or n is more "plausible" (i.e., probable) by comparing both n and nv with the pixel height of the bar or the position of the axis label which the respective symbol string was assigned to. In addition, the n and nv value extracted for a particular bar having a particular pixel height is compared with the n and nv values extracted from the labels of other bars having other pixel heights. Thus, in case the OCR algorithm erroneously identified a instead of a "." or vice versa, the resulting nv value is automatically identified as implausible and is ignored as the nv value does not correlate proportionately to the height of the respective bar. In this case, the n value may be used if it is more plausible than the nv value.

A "chart" as used herein is a graphical representation of data. A chart can be, for example and without limitation, a plot, a histogram, a bar chart (bars oriented horizontally or vertically), a polar plot, a diagram, a pie chart, a pie cake chart, a 3d chart, a 3d pie cake chart, a doughnut chart, an exploded pie chart, a polar area diagram, a ring chart, a sunburst chart, a multilevel pie chart, a square (pizza) chart, a polar plot, a ternary diagram or the like. In particular, a "chart", "digital chart" or "chart image" used as input for extracting data is a pixel matrix, also referred to as bitmap. It does not relate to a special data object used by a charting application for processing and manipulating charts wherein the graphical chart elements and corresponding numerical data values are already stored in a well-organized, structured manner.

The chart may be a graphical representation of any kind, e.g. a vector graphic or a pixel graphic, e.g. a .jpg file, e.g. a scan of a newspaper chart image or a picture provided by a remote server and presented in a browser. The chart may be displayed by the operating system alone or in interoperation with any kind of application program, e.g. a presentation program, a spreadsheet program, a browser, etc.

The tabular data format may be; for example, a table or data in .CSV format which can be used by many data analysis programs (e.g. Excel, PowerPoint, OpenOffice etc.).

A "series" as used herein is a set of data values, in particular number values, that characterize a property of a particular class of objects. A chart can comprise multiple series. For example, a bar chart may be descriptive of the sex of the students participating in four courses "biology", "math", "computer sciences" and "physics". The chart may comprise four groups (or "categories") of bars for the four courses. Each group of bars may consist of exactly two bars, a first one representing the number of female participants and the second one representing the number of male participants. Thus, the first series of the chart corresponds to the totality of female students and is represented in the form of four separate bars in the first position of each category. The second series of the chart corresponds to the totality of male students and is represented in the form of four separate bars in the second position of each category.

A "category value" as used herein is an attribute used for grouping numerical values of at least one series, whereby the numerical values of said at least one series which have assigned the same category value are aggregated and the aggregated values for said category are represented by graphical chart elements. For instance, a "category" is a group of one or more bars in a bar chart. Each bar represents the numerical value of one series for said category. The number of bars per category in a chart is constant but some bars may have a height of "0" and may not be visible. For example, the height of the first bar of the category "math" in the above example represents the total number of female students participating in the math course ("math" is the attribute shared by all female students counted for plotting said bar).

A "frame" as used herein is a graphical control element. It consists of a visual area containing some of the graphical user interface of the program it belongs to and is framed by a window decoration. It usually has a rectangular shape that can overlap with the area of other windows. The frame may be movable via a pointing device, e.g. a mouse, a finger moving over a touch-sensitive screen, or the like.

A "screenshot" as used herein is a picture of an area of one or more screens that shows what said one or more screens are displaying in said area at the moment when the screenshot is taken. The screenshot can be a pixel graphic, in particular a pixel matrix.

A "virtual screen" or "virtual desktop" as used herein is a virtual desktop environment expanded beyond the physical limits of the display area of one or more screens operatively connected to the computer hosting the software, typically the operating system. The generation of a virtual screen compensates for a limited size of the physical screen(s) by virtually expanding the size of the desktop beyond the size of the physical viewing device(s). Typically, scrolling/panning a subsection of the virtual desktop into view is used to navigate an oversized virtual desktop. Virtual screens make it possible to pan around a desktop that is larger than the available hardware is capable of displaying. For example, if a graphics card has a maximum resolution that is higher than the monitor's display resolution, the virtual desktop manager may allow windows to be placed "off the edge" of the screen. The user may then scroll to them by moving the mouse pointer to the edge of the display.

A "viewport" is the visible part of a virtual screen. The viewport may comprise multiple overlapping or non-overlapping viewport rectangles, each viewport rectangle representing the physical screen area of a physical screen coupled to a computer whose software computes the virtual screen.

The graphic card will render GUI elements only in case they are located within the viewport of the virtual screen. Thus, the coordinate system of the virtual screen comprises a viewport with computed pixel intensities that are displayed on one or more physical screens and comprises areas (referred herein as "black areas" or "extra-viewport areas") for which no intensity information is available. The pixels of said extra-viewport areas have typically assigned the intensity value "0" and thus represent pixels of a black color. However, a "zero-intensity" pixel in the viewport represents the color information "black" while a "zero-intensity" pixel in the extra-viewport areas of the virtual screen represents the absence of image information for said pixel.

A "screen buffer" as used herein is a portion of computer memory used to control the pixel intensities, e.g. color values, of a screen of a display device. The screen buffer may also be called the video buffer, the regeneration buffer, or regen buffer for short.

A "selected screen area" as used herein is a selected virtual screen area and may cover a region of one or more physical screens. It may be determined by the user by using a frame. For example, a selected screen area can selectively cover a subset of pixels of a single physical screen; or it can cover a mixture of extra-viewport pixels and of intra-viewport pixels of a virtual screen covering one or more physical screens.

Figure 1:
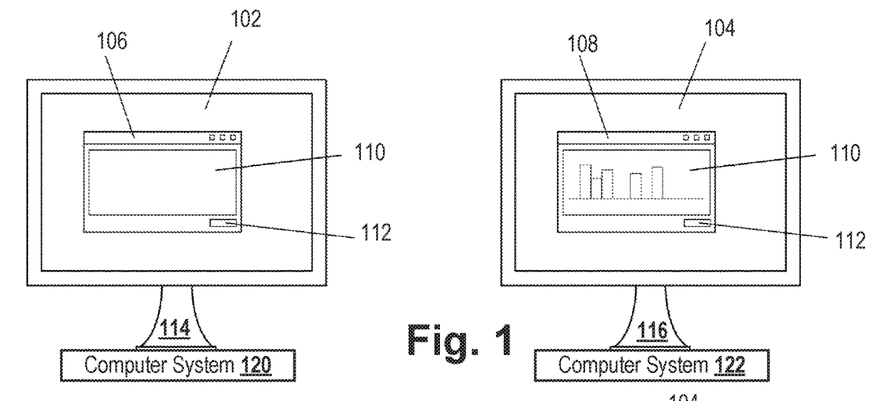
FIG. 1 depicts two frames displayed on two different screens.

FIG. 1 depicts a first display device 114 and a second display device 116, e.g. two LCD monitors, coupled to respective computer systems 120, 122. Each of the two computer systems comprises one or more processors, a screen capture module and respective one of the display devices 114, 116. The first display device comprises a first screen 102 and the second display device 116 comprises a second screen 104. The screen capture modules are respectively adapted for automatically extracting data from a chart in a screenshot. The capture module of the computer system of the first screen 102 enables the user to select a screen region 110 by dropping a frame 106. The frame 106 can be moved over the screen 102 and resized in a manner the user is familiar with, e.g. by selecting the borders and/or edges of the frame with a mouse and moving the mouse while pressing down a mouse button. As soon as the user has stopped moving or resizing the frame 106, a screenshot of the area of the screen region 110 (FIG. 1 left part) that is covered by the frame 106 is taken and analyzed in an image analysis step. This means that user's selection is not final and can be interactively changed anytime simply by moving or resizing the frame. Furthermore, the user does not need to actively trigger the image analysis to be performed on the screenshot. Rather, image analysis is executed automatically upon the frame was released and the user has stopped moving or resizing the frame.

When the image analysis terminates, some results are overlaid on the screen inside the frame as "overlay GUI elements" 110 (FIG. 1 right part). The overlay GUI elements 110 may comprise geometrical objects, e.g. lines, being indicative of identified graphical chart components such as axes or bars to give the user some feedback whether the first image analysis managed to correctly identify said graphical chart components.

This provides the user with visual feedback on the quality of the image analysis, data extraction and chart segmentation steps. In addition, a selectable GUI element 112, e.g. a data import button, becomes activated. Upon selection by the user, the GUI element 112 automatically triggers the outputting of the processing result, e.g. triggers the copying of the extracted data to the clipboard (a part of the main memory of the computer system on which the capture module was instantiated) or import them into another application, e.g. Microsoft Excel.

The outputting may comprise displaying the extracted data to a user on the screen 104 or using the extracted data as input of a charting application and/or a spreadsheet application.

Figure 2A:
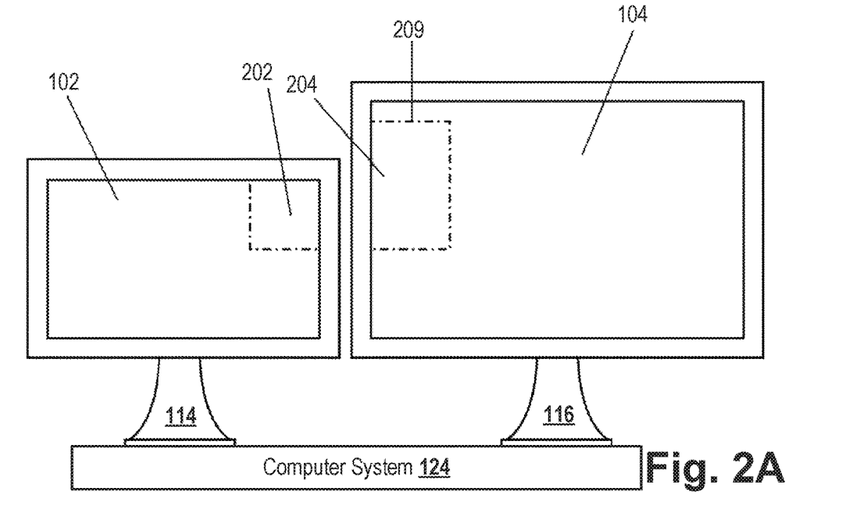
FIGS. 2A-2B collectively depict an area below a single frame and covering two different screens.

FIG. 2A depicts a computer system 124 comprising one or more processors and a capture module. The computer system is coupled to two display devices 114, 116 with respective screens 102, 104. In the depicted scenario, the selected screen area is selected by means of a frame (dotted lines 209) that is positioned such that it covers a first area 202 which is part of the first screen 102 and a second area 204 which is part of the second screen 104. For example, in case the browser window comprising an image of the chart from which data shall be extracted is displayed partially on the first screen 102 and partially on the second screen 104, the user does not have to move the browser window with the chart to one of the screens 102 or 104 before dropping or moving the frame onto the chart. Rather, even in case the chart is partially displayed on multiple different screens, the user can drop the frame onto said chart as described before and the image analysis will be executed immediately and accurately. The capturing of the screenshot comprises selectively reading pixel data stored in the screen buffers of the screens 102 and 104 as both are covered at least partially by the frame. The screen buffer of any third screen not covered by the frame (not shown) would not be read out by the capture module for generating the screenshot.

The frame is preferentially of rectangular shape. The areas 202, 204 represent intra-viewport pixel regions covered by the frame. The first screen 102 may be associated with a first screen buffer comprising intra-viewport pixel data for all pixels of the screen 102 and comprising in addition some extra-viewport pixels of a virtual desktop comprising some default, e.g. "black" pixels whose intensity depends on technical specifications of the screen buffer but not on the properties of any chart object. The second screen 104 may be associated with a second screen buffer comprising pixel data for all intra-viewport pixels displayed on the screen 104 and comprising in addition some extra-viewport pixels of the virtual desktop. For generating a screenshot, in a first step selectively the screen buffers of the first and second screens, but not of any further screens coupled to the computer system 124, if any, are read out.

This may reduce the size of the generated screenshot and increase the speed of screenshot generation as the amount of data that is read for generating the screenshot of the area covered by the frame is reduced. The advantage is particularly relevant if a plurality of large screens are coupled to the computer system (as in case of a growing number of desktop computers) or if the processing power of the computer system is comparatively weak (as in case of mobile telecommunication devices).

Figure 2B:
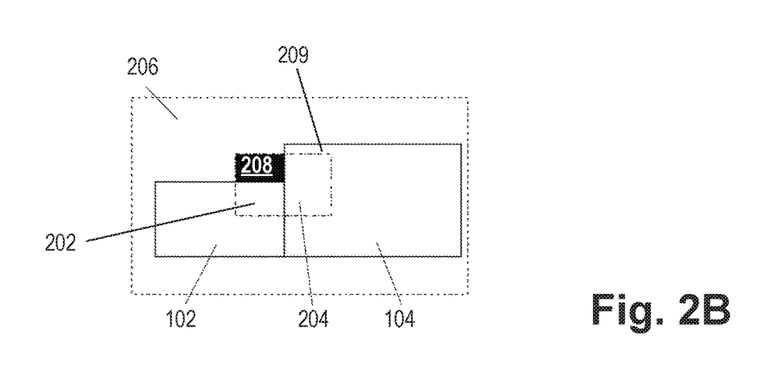

According to further embodiments illustrated in FIG. 2B, the capturing of the screenshot comprises identifying a region 208, which is covered by the frame 209 but which does not correspond to the screen area of any physical screen connected to the computer system 124. The region 208 consists of extra-viewport pixels not displayed on any one of the one or more physical screens 102, 104. The region can be identified by means of a pixel mask as described above.

State of the art methods of generating screenshots typically read the totality of pixels corresponding to the virtual screens comprising the one or more coupled screens 102, 104 into memory and then select pixel data of the pixels in the intra-viewport screen areas 202, 204 and extra-viewport area 208 to generate a screenshot. Thus, state of the art approaches would generate a screenshot that covers also an extra-viewport pixel area 208 if it is contained in the region of interest. Extra-viewport pixels in area 208 typically have assigned the intensity value "0" and thus appear to be black/cannot be discriminated from black pixels within the viewport. This may result in errors in case the frame covers also an area 208 outside the viewport, because the "quasi-black" image information may erroneously be considered by the image analysis approach as a black bar of a chart or any other kind of chart element.

To prevent this kind of error, the capture module is configured to identify and filter out any pixels in a pixel region 208 covered by the frame and lying outside the portions of the virtual desktop which are displayed by the physical screens connected to the computer system. Preferentially, the frame has a rectangular shape. This may ease and accelerate the identification of the area 208 as one or more simple geometrical INTERSECT operations are sufficient for identifying the extra-viewport pixel area 208 covered by the selected screen area 209. Thus, the generated screenshot lacks pixel information of the area 208. Alternatively, the capture module may simply ignore all pixels within the region 208 during later image analysis, e.g. during image segmentation. In effect, an image analysis method is provided that is robust against an erroneous identification of non-viewport pixels as relevant chart elements.

Figure 3:
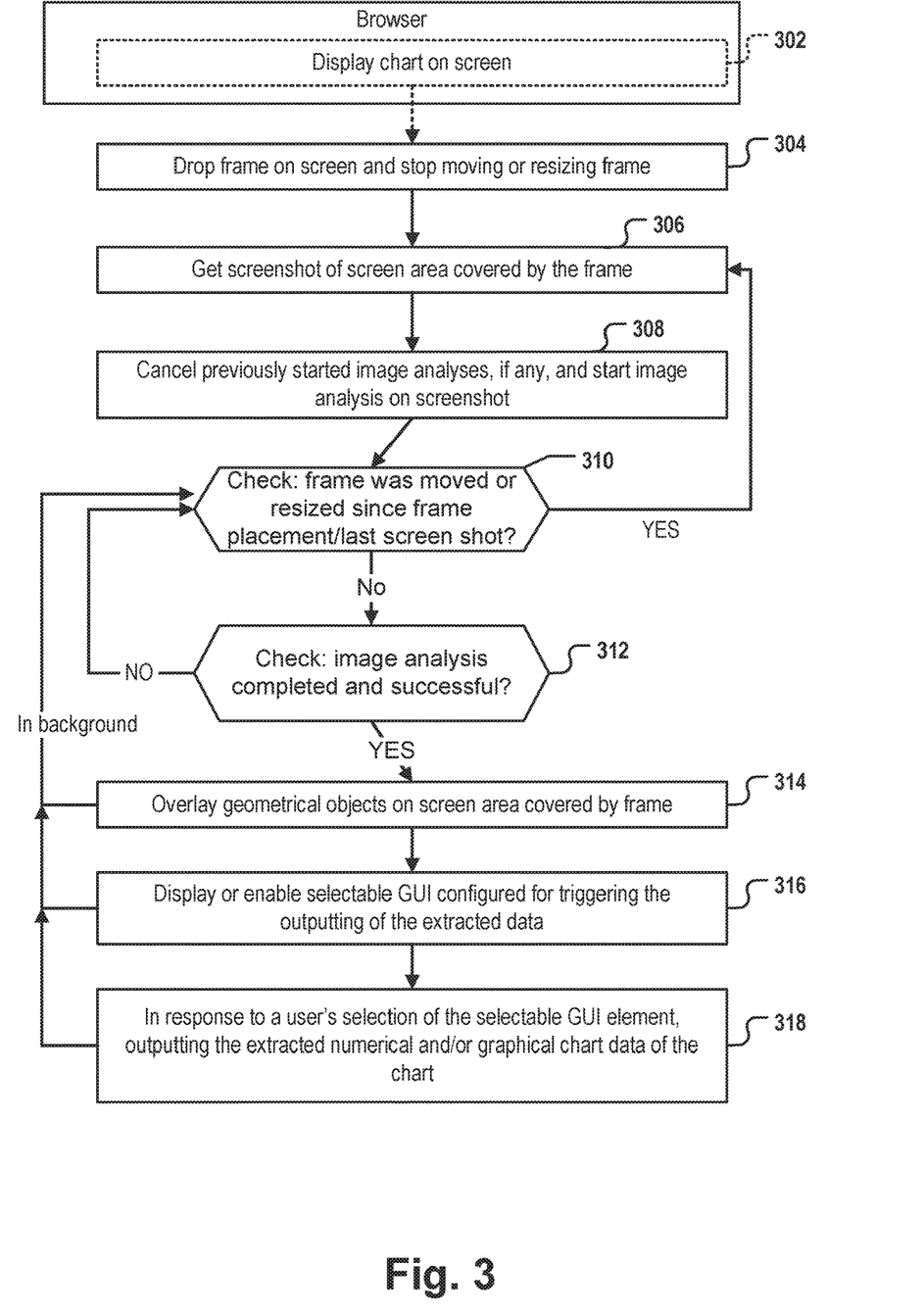
FIG. 3 depicts a flow chart of a method for a frame-based image capturing and analysis.

FIG. 3 depicts a flow chart of a method for frame-based image capturing and analysis. The method may be implemented on a computer system with one or more processors and one or more screens as depicted, for example, in FIGS. 1 and 2. The computer system comprises a capture module which may be implemented as a stand-alone application program, add-in or plug-in of another application program, e.g. of a spreadsheet or presentation program or of a web browser. In a first step 302, an application program, e.g. a web-browser, displays a chart on one or more of the screens 102, 104. Before or after step 302, the user instantiates the capture module, e.g. by selecting a menu element of a screen capture add-in of Excel, by clicking on an executable program logic constituting or comprising the screen capture module or other known ways of instantiating a program or program module. The frame of a predefined size appears automatically upon instantiation of the capture module or upon an explicit user action that triggers the generation and display of the frame by the capture module. Alternatively, the instantiated capture module automatically turns the cursor into a selector object. The selector object is configured to generate and expand a frame upon a user selecting a pixel on the screen with the left mouse button and moving the mouse over the screen while holding the mouse button pressed, thereby generating and expanding a frame whose first corner is the selected pixel and whose second corner is the mouse cursor pixel. When the user releases the mouse button, a frame is displayed comprising the selected pixel and the cursor pixel at the moment of releasing the mouse button on opposite corners of the frame. Once the frame has been positioned on the screen, it can be moved over the screen(s) and/or can be resized by the user to ensure that the frame completely covers the chart whose data shall be extracted.

Thus, depending on the embodiment, multiple different ways of initializing the frame by the screen capture module and multiple different ways of resizing and repositioning a frame by the user may be used for enabling a user to select an arbitrary region of a screen that displays the chart of interest.

In step 304, the user moves the generated frame over the one or more screens and resizes the frame until the frame comprises the chart completely and preferentially does not comprise too many pixels which are not part of the chart. Using a frame for screenshot capturing of a chart may be advantageous as it is not necessary to load, upload or generate an image file as input for starting the data extraction from an image. So the chart data may be extracted from any kind of application program without any image file format conversion or upload operation for providing the chart image data. The dropping of the frame in step 304 corresponds to the steps of releasing the frame at a particular position and stopping/avoiding to move or resize the frame. In response to determining by the capture module that the frame was dropped or released, the capture module in step 306 gets a screenshot of the area covered by the frame. In case any image analysis process started previously is still ongoing, said image analysis is terminated in step 308 without outputting a result. In addition, in step 308 an image analysis process for extracting data from the chart in the screenshot is initialized automatically without any additional, explicit user action. In step 310, while performing the image analysis, the capture module repeatedly checks if the frame was moved or resized. In case the frame was moved or resized, the process continues with step 306. Otherwise, the capture module checks in step 312 if the image analysis process completed successfully. If the image analysis is still ongoing, step 310 is executed. Otherwise, the capture module in step 314 generates overlay GUI elements, i.e., geometrical objects like squares, lines, bars, and the like are generated and displayed as an overlay of the chart elements on the one or more screens. In addition, the capture module in step 316 generates and displays a selectable GUI element, e.g. a data export button. The selectable GUI element may be displayed as an element of the frame. In response to a user's selection of the selectable GUI element, the extracted numerical and/or graphical chart data is output by the capture module in step 318.

Figure 4:
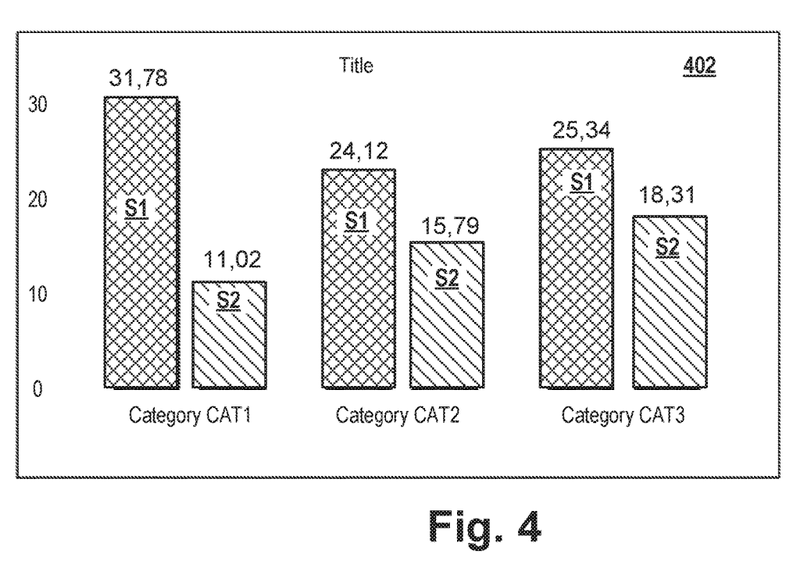
FIG. 4 depicts a vertical bar chart comprised in a screenshot.

FIG. 4 depicts a vertical bar chart 402 comprising six bars. The bars are grouped into three different categories CAT1, CAT2, CAT3 and belong to two different series S1, S2. Each series corresponds to a respective color of the bars. The chart may comprise labels consisting of a sequence of symbols. In the depicted bar chart, each label on top of a bar represents the exact numerical value of the data value that is graphically represented by said bar. The plausibility of an identified numerical value, extracted via an OCR method from one of the labels by interpreting the identified numerical string as a fractional number, may be verified by correlating the identified numerical values with the heights of the bars (identified e.g. by means of a segmentation algorithm). If an identified numerical value is implausible, the capture module automatically generates a new candidate numerical value by ignoring a decimal separator identified in a label and automatically checks if the new candidate numerical value is more plausible, i.e., better corresponds to the height of the respective bar, than the previously extracted numerical value.

Figure 5:
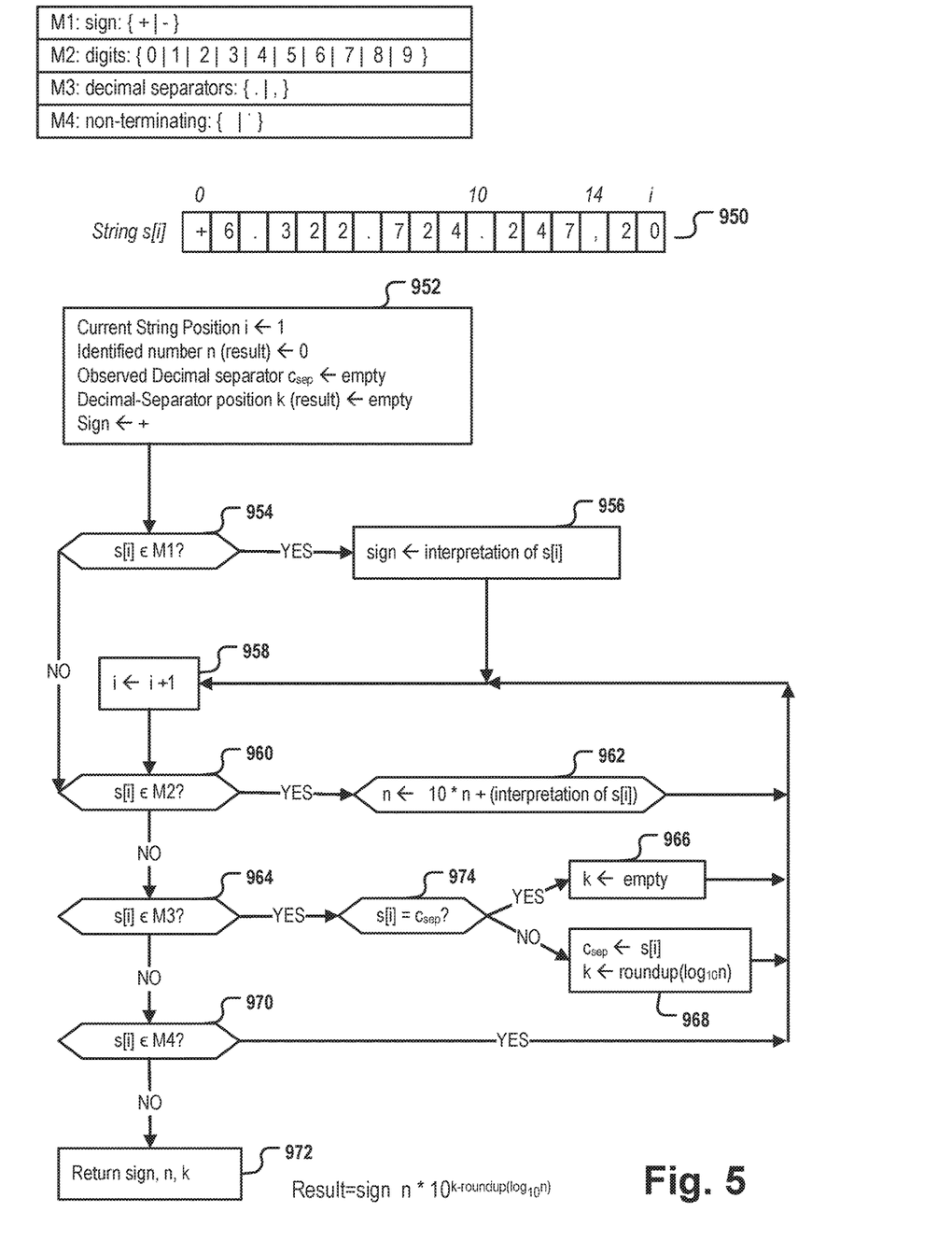
FIG. 5 is a flow chart of a method for identifying decimal-separators and other characteristics of a numerical value received as a symbol string.

According to embodiments, the extraction of a numerical value from a bar label of a chart and a plausibility check of said data value is executed, e.g. by the capture module, in accordance with a method comprising:

a set of valid decimal separators, e.g. "," and ".";

performing an OCR algorithm on a label contained in the chart, e.g. of the label "31,78" above the first bar of the chart, to generate an array of symbols contained in said label;

analyzing each of the symbols in the array from left to right for determining if the symbol is element of the set of valid decimal separators;

use the last symbol having been identified as decimal separator, if any, for interpreting and extracting the numerical value nv from said array; for example, the decimal separator can be identified, together with other types of symbols like sign symbols or digits as described for an embodiment of the invention depicted in FIG. 5.

identifying a first height of a first graphical element in proximal vicinity to the identified string that has been extracted by applying an image segmentation algorithm; for example, the height of the leftmost bar of the chart 402 can be identified by means of a segmentation algorithm;

identifying one or more further strings in the image by applying the OCR algorithm; for example, the label "11,02" of the second bar and the label "24,12" of the third bar could be identified as a further string;

extracting a respective further numerical value nv2 from each of the one or more further strings; for example, the numerical values 11.02 and 24.12 could be extracted from the labels;

for each of the one or more further strings, identifying a second height of a further graphical element in proximal vicinity to said further identified string, by applying the image segmentation algorithm; for example, the image segmentation algorithm may be applied prior to the extraction of the strings and may automatically determine segment borders for all bars or other graphical elements in a chart in a single run; after completion of the segmentation algorithm, the heights of all bars or other chart elements in the chart for which numerical data shall be extracted may be determined; in the example depicted in FIG. 5, this step comprises identifying the height of the second, third and optionally all further bars in the chart;

comparing the numerical value nv (e.g. 31.78) with the one or more further numerical values nv2 (e.g. 11.02, 24.12, . . . ) and comparing the first height with the one or more second heights for determining if the numerical value nv is in the same proportion to the first height like each of the further numerical values nv2 is to its respective second height; for example, in case the OCR algorithm would incorrectly have identified an additional potential decimal separator in the first label according to "31,7.8" and would erroneously have interpreted this number as 317.8 instead of 31.78, the comparison of the height of the first bars with the height of the other bars and the comparison of the numerical values extracted for the compared bars would reveal that the first extracted numerical value nv is implausible; preferentially, two or more further bars and their respective heights and numerical values are analyzed compared with the height and numerical value of the first bar; this may have the advantage that an OCR error that occurred during the extraction of one of the further values can be outvoted by the other further numerical values and respective heights; and rejecting the identified decimal separator and the extracted numerical value nv as incorrect in case the numerical value is not in the same proportion; optionally, the method may in addition comprise further testing the plausibility of the integer interpretation n.

FIG. 5 is a flow chart of a method for identifying decimal separators and other characteristics of a numerical value received as a symbol string. A common problem associated with extracting numerical values from charts is that the interpretation of the numerical values is difficult due to many different international conventions of decimal and thousands separators. The string "2,718" may be interpreted as 2718 (US convention) or 2.718 (German convention), while "2'718" may only be interpreted as 2718 (Swiss convention). The following procedure uses one single parsing process while determining the used decimal separators to convert a number's string representation to its reasonable numerical values, given a set of decimal separators. A further problem is that many OCR techniques have difficulties to interpreted small symbols like "." or ",", correctly, in particular if the resolution of a scan is low. Thus, the proposed number value extraction approach may be particularly fast and robust.

In a first step, a plurality of symbol sets are defined. According to some embodiments, a first set of symbols M1 comprises sign symbols, e.g. "+" and "−". The signs symbols determine if a numerical value is positive or negative. A second set M2 comprises the totality of valid digits, e.g. "0", "1", . . . , "9". A third set M3 comprises a set of decimal separators which are valid in one or more different national or international conventions regarding the specification of numerical values, e.g. "." and ",". A fourth set M4 comprises non-terminating symbols, e.g. the space symbol " " (US and European convention) and an apostrophe "'" (Swiss convention) used in some conventions as thousands-separators which should ease reading but which should not be interpreted as the end of a number or as a decimal separator.

Then, a string s comprising a sequence of symbols is received by the capture module. For example, the string can be a label of a bar or of an axis unit of the chart in the screenshot taken by the capture module. The string s may be extracted from the screenshot.

In a first step 952, the capture module initializes several variables. For example, the current symbol position i to be analyzed in the string is set to 1, the variable n which is the variable to store the numerical value extracted from the string is set to 0, and the $c_{sep}$ variable which is the variable to store any decimal separator, if any, that has already been identified in the string is set to NULL. The sign variable is set to "+" and the variable k which is the variable to store the position of an observed decimal separator (counting positions from left to right) is set to NULL.

In step 954, the capture module checks if the currently evaluated symbol s[i] belongs to the set M1. If so, the sign specified in the current symbol is assigned to the sign variable in step 956 and the next symbol is selected in step 958.

According to embodiments, the extracted numerical value is positive by default. It is considered to be a negative value only in case a minus sign symbol was identified. This may be advantageous as many charts show only positive numbers and the chart labels lack any explicit positive or negative sign symbol.

If the current symbol is not element of M1, the capture module checks in step 960 if the current symbol is element of M2, i.e., the set of characters that can be interpreted as a digit. If so, the digit specified in the current symbol is extracted and concatenated with the one or more previously extracted digit symbols, if any, in step 962. Then, the next symbol is selected in step 958.

If the current symbol is not element of M2, the capture module checks in step 964 if the current symbol is element of M3, i.e., the set of valid decimal separators. If so, the decimal separator specified in the current symbol is extracted and in step 974 the capture module checks if this particular decimal separator is already set as the current decimal separator (candidate) $c_{sep}$. If this particular decimal separator is not the same as the current guess, it is stored in variable $c_{sep}$, replacing the value currently assigned to the variable $c_{sep}$ and the decimal-separator-position k is set to the value k=roundup($\log_{10}$ n) in step 968. Thereby, n is the current numerical value resulting from concatenating all digits having been identified so far. If this particular decimal separator is already set as the current decimal separator $c_{sep}$, the decimal-separator-position k is set to NULL in step 966. Then, the next symbol is selected in step 958.

If the current symbol is not element of M3, the capture module checks in step 970 if the current symbol is element of M4, i.e., the set of characters that can be ignored as said symbols are non-terminating. If so, the current symbol is ignored and the next symbol is selected in step 958.

If the current symbol is not element of M4, the capture module outputs the numerical value nv or a plurality of numerical values having been extracted from the chart in a similar manner. For example, the numerical value(s) are copied into the clipboard or a destination program in a tabular form.

The numerical value nv taking into consideration also any decimal separator identified can be computed from the extracted variables sign, n and k as follows, if k is not empty:

nv is an integral number computed according to $nv=sign*n*10^{k-roundup\ (\log_{10} n)}$. For example, for a string s=+6.322.724.247, 20 the number n would be 6322724247.20.

In the current example, a candidate decimal separator "," is identified at position 15. At this point of the parsing process, n=6322724247.

Thus, k=roundup($\log_{10}$(6322724247))=10.

In the above example for the string s=+6.322.724.247,20, the "." is determined as not being a decimal separator as it was consecutively considered as a decimal separator more than once. The extracted numerical value is a positive decimal value.

The extracted numerical value nv would be:

$$nv=sign*n*10^{k-roundup(\log_{10} n)} \qquad \text{(general formula)}$$

$$=sign\ 632272424720*10^{10-roundup(\log_{10} 6322724247 20)}$$

$$=sign\ 632272424720*10^{10-12}=6322724247.20 \qquad \text{(current example).}$$

Thus, at least the parameter nv is returned. In case k is Null, nv cannot be computed. Optionally, n, nv, k and sign are returned. For the above given example, the following values may be obtained returned:
sign=+1; n=632272424720; k=10, nv=6322724247.20.

Optionally, sign*n and nv may be compared with the height of the bar to which the symbol string s was assigned and also with the height and sign*n and nv values extracted for other bars of a chart in order to check if the identified decimal separator at position 15 is plausible. If the plausibility check indicates that nv is not in proportion to the height of its associated bars and the height of the other bars, the value sign*n may be used instead of nv for generating the tabular data structure that is transferred to the target application.

The invention claimed is:

1. A computer-implemented method for automatically extracting data from a chart, the method comprising:
   generating and displaying a graphical user interface (GUI) including a frame enabling a user to select a screen area covering one or more screens at least partially, the screen area displaying a chart, the frame being movable and resizable by the user to cover the chart displayed on the one or more screens;
   determining whether the user has selected the screen area based on whether the user has moved and dropped the frame or resized and released the frame;
   in response to determining that the user has selected the screen area, automatically taking a screenshot of the selected screen area that is currently covered by the frame, and automatically performing an image analysis of the screenshot for extracting data from the chart contained in the screenshot, without any additional user input;
   determining whether the image analysis of the screenshot has completed successfully;
   in response to determining that the image analysis of the screenshot has not yet completed successfully,
      checking whether the user resizes or moves the frame while the image analysis of the screenshot is being performed,
      in response to determining that the user resizes or moves the frame while the image analysis of the screenshot is being performed, automatically aborting the image analysis of the screenshot, and
      in response to determining that the user has selected a further screen area based on whether the user has further moved and dropped the frame or further resized and released the frame, automatically taking a further screenshot of the selected further screen area, and automatically performing the image analysis of the further screenshot for extracting further data from the chart contained in the further screenshot, without any additional user input; and
   in response to determining that the image analysis of the screenshot or the further screenshot has completed successfully,
      automatically displaying or enabling a selectable GUI element configured for triggering output of the extracted data or the extracted further data, and in response to a select action of the user having selected said selectable GUI element, outputting the extracted data or the extracted further data.

2. The computer-implemented method of claim 1, the graphical user interface being configured to enable the user to select the screen area that displays the chart irrespective of a type of application program that generated and rendered the chart and irrespective whether said application program is remote or local.

3. The computer-implemented method of claim 1, an interior of the frame being transparent or semi-transparent for enabling the user to view an area of the one or more screens currently covered by said frame.

4. The computer-implemented method of claim 1, further comprising:
the frame remaining in the foreground of all windows among one or more windows presented on the one or more screens, irrespective of whether the user selects one of the one or more windows as an active window, at least while the screenshot capturing and the image analysis is performed, and
the frame and the one or more windows presented on the one or more screens becoming active or inactive, in dependence on the user selection, after completion of the image analysis.

5. The computer-implemented method of claim 1, further comprising:
in response to determining that the image analysis of the screenshot has completed successfully,
automatically generating and displaying one or more overlay GUI elements within the frame and on top of the chart, the one or more overlay GUI elements including geometrical objects indicative of graphical chart elements of the chart identified during the image analysis and being displayed in relation to the graphical chart elements, thereby enabling the user to verify whether the graphical chart elements were correctly identified during the image analysis.

6. The computer-implemented method of claim 1, the extracted data comprising one or more items of a group comprising:
numerical data being indicative of quantity of one or more elements of a data series;
axis labels being indicative of intervals of axes of the chart;
label strings of one or more axes of the chart;
label strings of one or more data series of the chart; and
label strings of one or more categories of the chart.

7. The computer-implemented method of claim 1, the extracted data being a tabular data structure that represents each category as a column and each series as a row or vice versa and that comprises a numerical data value in each table cell, the outputting of the extracted data comprising at least one of:
exporting the extracted data into a first application program configured for automatically generating charts from tabular data structures, and generating, by the first application program, a new chart from the extracted data; and
exporting the extracted data into a second application program configured for automatically analyzing numerical data contained in tabular data structures, and outputting, by the second application program, a numerical result generated by the analysis of the extracted data.

8. The computer-implemented method of claim 7, at least one of the first application program and the second application program being configured in advance, the exporting of the extracted data to the at least one of the first and the second application program being performed automatically in accordance with the configuration and without prompting the user to specify a target application program for the exporting of the extracted data.

9. The computer-implemented method of claim 1, being implemented on a computer system coupled to a plurality of screens, each screen having a respective screen buffer, comprising intra-viewport and extra-viewport pixels, the taking of the screenshot comprising:
reading selectively for each of the one or more screens which are at least partially covered by the selected screen area, pixel intensity values from the respective screen buffer of said screen; and
identifying pixels being covered by the selected screen area and being extra-viewport pixels of the one or more screens which are at least partially covered by the selected screen area; and
excluding the identified pixels from the generation of the screenshot or ignoring the identified pixels when performing the image analysis on the screenshot.

10. The computer-implemented method of claim 1, the extracted data comprising numerical data, the extraction of the numerical data comprising:
identifying a string of interest in the chart by applying an OCR algorithm, the string being an array of symbols;
analyzing each of the symbols for assigning values to a set of variables sign, n, k and $c_{sep}$, wherein n is a number variable representing a concatenation of all symbols of the string identified as being digits, sign is a signs symbol contained in the string, if any, $c_{sep}$ is a last identified decimal separator symbol in the string, if any, and k is a position of the last identified decimal separator symbol in the string, if any;
computing a numerical value nv according to nv=sign n*$10^{k-roundup(log_{10} n)}$; and
returning the numerical value nv.

11. The computer-implemented method of claim 1, the extracted data comprising numerical data, the extraction of the numerical data comprising:
defining a set of valid signs, a set of valid digits, a set of valid decimal separators and a set of valid non-terminating symbols;
initializing a sign variable sign, a number-variable n, a string position counter i, a decimal separator candidate variable $c_{sep}$ and an observed-decimal-separator-position variable k;
identifying a string in the chart, the string being an array of symbols;
for each of the symbols s[i] in the array from left to right:
a) checking if a current symbol is an element of the valid signs set;
b) if a) returns true, set the sign variable to the current symbol, select next symbol and proceed to d);
c) if a) returns false, proceed to d);
d) checking if the current symbol is an element of the valid digits set;
e) if d) returns true, assign a new concatenated value to the number-variable n according to n←n·s[i], select next symbol and proceed to d);
f) if d) returns false, checking if the current symbol is an element of the valid decimal separator set;
g) if f) returns true, checking if the current symbol has already been assigned to a current decimal separator $c_{sep}$ in the string, and if so, setting k to empty; otherwise, assigning a current symbol value to $c_{sep}$ and assigning roundup($\log_{10}$ n) to k; select next symbol and proceed to d);

h) if f) returns false, checking if the current symbol is an element of the valid non-terminating symbols set;

i) if h) returns true, select next symbol and proceed to d); and j) if h) returns false and k is not empty, output a numerical value nv computed according to nv=sign n*$10^{k-roundup(\log_{10}n)}$.

12. A computer system for automatically extracting data from a chart, the computer system comprising:

one or more display devices including one or more screens;

one or more memories configured to store computer-readable instructions; and one or more processors configured to execute the computer-readable instructions to cause the computer system to generate and display a graphical user interface (GUI) including a frame enabling a user to select a screen area covering the one or more screens at least partially, the screen area displaying a chart, the frame being movable and resizable by the user to cover the chart displayed on the one or more screens;

determine whether the user has selected the screen area based on whether the user has moved and dropped the frame or resized and released the frame;

in response to determining that the user has selected the screen area, automatically take a screenshot of the selected screen area that is currently covered by the frame, and automatically perform an image analysis of the screenshot for extracting data from the chart contained in the screenshot, without any additional user input;

determine whether the image analysis of the screenshot has completed successfully;

in response to determining that the image analysis of the screenshot has not yet completed successfully, checking whether the user resizes or moves the frame while the image analysis of the screenshot is being performed, in response to determining that the user resizes or moves the frame while the image analysis of the screenshot is being performed, automatically aborting the image analysis of the screenshot, and in response to determining that the user has selected a further screen area based on whether the user has further moved and dropped the frame or further resized and released the frame, automatically taking a further screenshot of the selected further screen area, and automatically performing the image analysis of the further screenshot for extracting further data from the chart contained in the further screenshot, without any additional user input; and in response to determining that the image analysis of the screenshot or the further screenshot has completed successfully, automatically display or enable a selectable GUI element configured for triggering output of the extracted data or the extracted further data, and in response to a select action of the user having selected said selectable GUI element, output the extracted data or the extracted further data.

13. A non-transitory computer-readable storage medium comprising instructions which, when executed by a processor, cause the processor to automatically extract data from a chart by:

generating and displaying a graphical user interface (GUI) including a frame enabling a user to select a screen area covering one or more screens at least partially, the screen area displaying a chart, the frame being movable and resizable by the user to cover the chart displayed on the one or more screens;

determining whether the user has selected the screen area based on whether the user has moved and dropped the frame or resized and released the frame;

in response to determining that the user has selected the screen area, automatically taking a screenshot of the selected screen area that is currently covered by the frame, and automatically performing an image analysis of the screenshot for extracting data from the chart contained in the screenshot, without any additional user input;

determining whether the image analysis of the screenshot has completed successfully;

in response to determining that the image analysis of the screenshot has not yet completed successfully, checking whether the user resizes or moves the frame while the image analysis of the screenshot is being performed, in response to determining that the user resizes or moves the frame while the image analysis of the screenshot is being performed, automatically aborting the image analysis of the screenshot, and in response to determining that the user has selected a further screen area based on whether the user has further moved and dropped the frame or further resized and released the frame, automatically taking a further screenshot of the selected further screen area, and automatically performing the image analysis of the further screenshot for extracting further data from the chart contained in the further screenshot, without any additional user input; and in response to determining that the image analysis of the screenshot or the further screenshot has completed successfully, automatically displaying or enabling a selectable GUI element configured for triggering output of the extracted data or the extracted further data, and in response to a select action of the user having selected said selectable GUI element, outputting the extracted data or the extracted further data.

14. The computer-implemented method of claim 10, the extraction of the numerical data comprising:

defining a set of valid signs, a set of valid digits, a set of valid decimal separators and a set of valid non-terminating symbols;

initializing the sign variable sign, the number-variable n, the string position counter i, the decimal separator candidate variable $c_{sep}$ and the observed-decimal-separator-position variable k;

for each of the symbols s[i] in the array from left to right:

a) checking if a current symbol is an element of the valid signs set;

b) if a) returns true, set the sign variable to the current symbol, select next symbol and proceed to d);

c) if a) returns false, proceed to d);

d) checking if the current symbol is an element of the valid digits set;

e) if d) returns true, assign a new concatenated value to the number-variable n according to n←n·s[i], select next symbol and proceed to d);

f) if d) returns false, checking if the current symbol is an element of the valid decimal separator set;

g) if f) returns true, checking if the current symbol has already been assigned to a current decimal separator $c_{sep}$ in the string, and if so, setting k to empty; otherwise, assigning a current symbol value to $c_{sep}$ and assigning roundup($\log_{10}$ n) to k; select next symbol and proceed to d);

h) if f) returns false, checking if the current symbol is an element of the valid non-terminating symbols set;

i) if h) returns true, select next symbol and proceed to d); and j) if h) returns false and k is not empty, output a numerical value nv computed according to nv=sign n*$10^{k-roundup(\log_{10} n)}$.

15. The computer-implemented method of claim 10, the extraction of the numerical data comprising:

defining a set of valid decimal separators;

analyzing each symbol in the array from left to right for determining if the symbol is an element of the set of valid decimal separators;

use a last symbol having been identified as a decimal separator, if any, for interpreting and extracting the numerical value nv;

identifying a first height of a first graphical element in proximal vicinity to the identified string by applying an image segmentation algorithm;

identifying one or more further strings in the image by applying the OCR algorithm;

extracting one or more further numerical values nv2 from each of the one or more further strings;

for each identified further string of the one or more further strings, identifying one or more second heights of one or more further graphical elements in proximal vicinity to said identified further string by said applying of the image segmentation algorithm;

comparing the numerical value nv with the one or more further numerical values nv2 and comparing the first height with the one or more second heights for determining if the numerical value nv is in a same proportion to the first height like each of the one or more further numerical values nv2 is to the one or more second heights, respectively; and rejecting the identified decimal separator and the numerical value nv as incorrect in case the numerical value nv is not in the same proportion.

* * * * *